United States Patent
Nonaka et al.

(10) Patent No.: US 11,911,850 B2
(45) Date of Patent: Feb. 27, 2024

(54) PILLAR DELIVERY METHOD, METHOD FOR MANUFACTURING GLASS PANEL UNIT, AND PILLAR DELIVERY APPARATUS

(71) Applicant: PANASONIC INTELLECTUAL PROPERTY MANAGEMENT CO., LTD., Osaka (JP)

(72) Inventors: Masataka Nonaka, Osaka (JP); Eiichi Uriu, Osaka (JP); Takeshi Shimizu, Osaka (JP); Kazuya Hasegawa, Osaka (JP); Tasuku Ishibashi, Ishikawa (JP); Hiroyuki Abe, Osaka (JP); Haruhiko Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 624 days.

(21) Appl. No.: 17/052,677

(22) PCT Filed: May 16, 2019

(86) PCT No.: PCT/JP2019/019450
§ 371 (c)(1),
(2) Date: Nov. 3, 2020

(87) PCT Pub. No.: WO2020/003793
PCT Pub. Date: Jan. 2, 2020

(65) Prior Publication Data
US 2021/0178525 A1    Jun. 17, 2021

(30) Foreign Application Priority Data
Jun. 28, 2018 (JP) .................. 2018-123638

(51) Int. Cl.
*B23K 26/38* (2014.01)
*C03C 27/06* (2006.01)
*E06B 3/66* (2006.01)

(52) U.S. Cl.
CPC .............. *B23K 26/38* (2013.01); *C03C 27/06* (2013.01); *E06B 3/6612* (2013.01)

(58) Field of Classification Search
CPC ........ E06B 3/6612; C03C 27/06; B23K 26/38
(Continued)

(56) References Cited

U.S. PATENT DOCUMENTS 6,210,763 B1   4/2001  Katoh et al.
7,792,609 B2 * 9/2010  Strasser ................. B21D 43/24
                                              271/18.1
(Continued)

FOREIGN PATENT DOCUMENTS

JP   H11-079799 A   3/1999
JP   2016-044097 A  4/2016
(Continued)

OTHER PUBLICATIONS

International Search Report and Written Opinino issued in Internatonal Patent Applicaiton No. PCT/JP2019/019450, dated Jul. 30, 2019; with partial translation.

*Primary Examiner* — Jimmy Chou
(74) *Attorney, Agent, or Firm* — Rimon P.C.

(57) ABSTRACT

A pillar delivery method is a method for delivering a plurality of pillars onto a substrate, including a glass panel, to manufacture a glass panel unit. The pillar delivery method includes an irradiation step, a holding step, and a mounting step. The irradiation step includes setting, over a holder, a sheet for use to form pillars and irradiating the sheet with a laser beam to punch out the plurality of pillars. The holding step includes having the plurality of pillars, which have been
(Continued)

punched out of the sheet, held by the holder. The mounting step includes picking up some or all of the plurality of pillars from the holder and mounting the pillars onto the substrate.

12 Claims, 17 Drawing Sheets

(58) Field of Classification Search
 USPC .................................................. 219/121.72
 See application file for complete search history.

(56) References Cited

U.S. PATENT DOCUMENTS

| | | | | |
|---|---|---|---|---|
| 8,615,857 | B2* | 12/2013 | Numata | H03H 9/1021 29/25.35 |
| 8,624,156 | B2* | 1/2014 | Matsuo | B23K 26/38 219/121.6 |
| 2002/0060210 | A1* | 5/2002 | Terada | B23K 26/38 219/121.76 |
| 2003/0209534 | A1* | 11/2003 | Ferguson | C04B 35/63 501/153 |
| 2006/0157191 | A1* | 7/2006 | Matsuo | B23K 26/382 438/464 |
| 2006/0246279 | A1* | 11/2006 | Urairi | H05K 3/0029 428/343 |
| 2007/0181543 | A1* | 8/2007 | Urairi | B23K 26/40 428/343 |
| 2009/0261072 | A1* | 10/2009 | Dieterich | B21D 43/24 414/797 |
| 2013/0001206 | A1* | 1/2013 | Yamamoto | B23K 26/703 219/121.72 |
| 2015/0132525 | A1* | 5/2015 | Kato | B32B 17/06 428/45 |
| 2017/0268284 | A1 | 9/2017 | Collins et al. | |
| 2017/0328124 | A1* | 11/2017 | Abe | E06B 3/66304 |
| 2018/0038152 | A1* | 2/2018 | Nonaka | B28D 1/24 |
| 2018/0043458 | A1* | 2/2018 | Barnes | B23K 26/0869 |
| 2018/0044235 | A1* | 2/2018 | Nonaka | C03C 27/06 |
| 2018/0244571 | A1* | 8/2018 | Uriu | C03C 27/10 |
| 2018/0282210 | A1* | 10/2018 | Ishibashi | E06B 3/6775 |
| 2018/0319707 | A1* | 11/2018 | Ishibashi | E06B 3/6612 |
| 2019/0055775 | A1* | 2/2019 | Abe | E06B 3/6775 |
| 2019/0055776 | A1* | 2/2019 | Uriu | B32B 37/0076 |
| 2019/0241457 | A1 | 8/2019 | Nonaka et al. | |
| 2020/0024189 | A1 | 1/2020 | Abe et al. | |

FOREIGN PATENT DOCUMENTS

| | | |
|---|---|---|
| WO | 2014/136152 A1 | 9/2014 |
| WO | 2016/147604 A1 | 9/2016 |
| WO | 2018/016366 A1 | 1/2018 |
| WO | 2018/062140 A1 | 4/2018 |

* cited by examiner

PILLAR DELIVERY METHOD, METHOD FOR MANUFACTURING GLASS PANEL UNIT, AND PILLAR DELIVERY APPARATUS

CROSS-REFERENCE OF RELATED APPLICATIONS

This application is the U.S. National Phase under 35 U.S.C. § 371 of International Patent Application No. PCT/JP2019/019450, filed on May 16, 2019, which in turn claims the benefit of Japanese Application No. 2018-123638, filed on Jun. 28, 2018, the entire disclosures of which Applications are incorporated by reference herein.

TECHNICAL FIELD

The present disclosure relates to a pillar delivery method, a method for manufacturing a glass panel unit, and a pillar delivery apparatus.

BACKGROUND ART

Patent Literature 1 discloses a known technique for delivering a plurality of pillars (or spacers) onto a single substrate (glass pane) during a manufacturing process of glass panel units. An internal space is formed by bonding another substrate onto the substrate on which the pillars have been delivered. Then, the internal space is sealed in an evacuated condition, thereby manufacturing a glass panel unit with excellent thermal insulation properties.

According to the known technique mentioned above, the plurality of pillars are made by subjecting a thin plate to a punching process. The plurality of pillars thus made are once stocked. When glass panel units are manufactured, some of those pillars needed for the manufacturing process are taken out of the stock and placed on the substrate.

Thus, according to the known technique, the pillars made by punching tend to have burr. In addition, the pillars need to be once stocked, which increases the number of manufacturing process steps and decreases the efficiency of manufacturing.

CITATION LIST

Patent Literature

Patent Literature 1: JP H11-79799 A

SUMMARY OF INVENTION

An object of the present disclosure is to provide a pillar delivery method, a method for manufacturing a glass panel unit, and a pillar delivery apparatus, all of which are configured or designed to efficiently deliver, onto a substrate, a plurality of pillars with significantly reduced burr.

A pillar delivery method according to an aspect is a method for delivering a plurality of pillars onto a substrate, including a glass panel, to manufacture a glass panel unit. The method includes: an irradiation step including setting, over a holder, a sheet for use to form pillars and irradiating the sheet with a laser beam to punch out the plurality of pillars; a holding step including having the plurality of pillars, which have been punched out of the sheet, held by the holder; and a mounting step including picking up some or all of the plurality of pillars from the holder and mounting the pillars onto the substrate.

A method for manufacturing a glass panel unit according to another aspect includes: a pillar delivery step including delivering the plurality of pillars onto the substrate by the pillar delivery method described above; an arrangement step including laying a counter substrate, including a glass panel, over the substrate; a bonding step including bonding respective peripheral edges of the substrate and the counter substrate together to form an internal space where the plurality of pillars are located; an evacuation step including evacuating the internal space; and a sealing step including sealing the internal space while keeping the internal space evacuated.

A pillar delivery apparatus according to still another aspect is an apparatus for delivering a plurality of pillars onto a substrate, including a glass panel, to manufacture a glass panel unit. The apparatus includes: a holder; a sheet for use to form pillars to be set over the holder; a laser cutter to punch out the plurality of pillars of the sheet by irradiating the sheet with a laser beam; and a mounter to pick up some or all of the plurality of pillars held by the holder and mount the pillars onto the substrate.

DESCRIPTION OF EMBODIMENTS

Exemplary Embodiment

Figure 1:
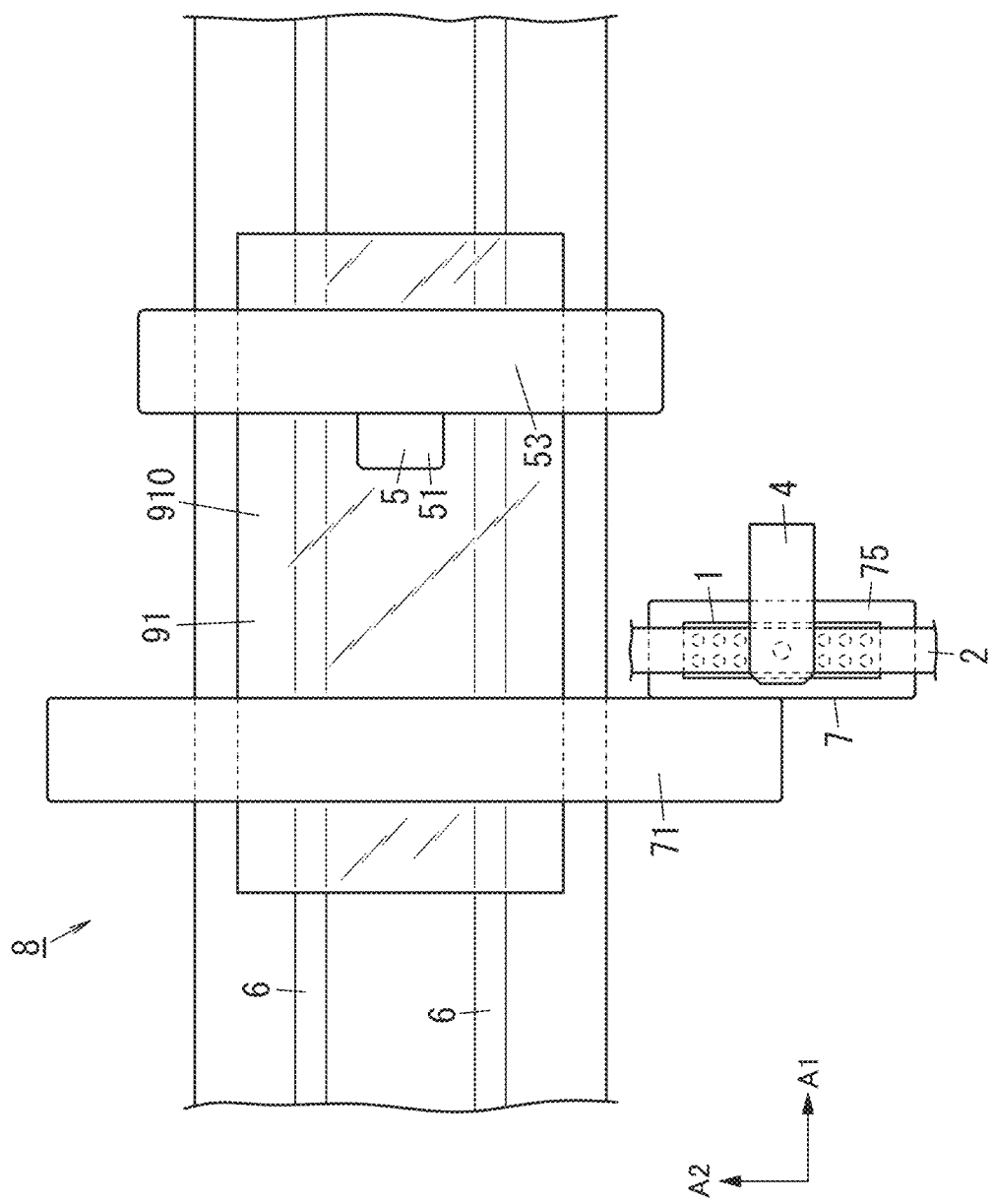
FIG. 1 is a plan view schematically illustrating a pillar delivery apparatus for use in a method for manufacturing a glass panel unit according to an exemplary embodiment.

A method for manufacturing a glass panel unit according to an exemplary embodiment will be described with reference to the accompanying drawings. The method for manufacturing a glass panel unit according to the exemplary embodiment includes a pillar delivery step, an arrangement step, a bonding step, an evacuation step, and a sealing step.

The pillar delivery step is the step of delivering a plurality of pillars 3 onto a substrate 91 including a glass panel 910.

The pillar delivery step includes: forming a plurality of pillars 3 at a location near the substrate 91 using the pillar delivery apparatus 8 schematically shown in FIGS. 1-7; having the plurality of pillars 3 just formed held by a holder 1 under the pillar delivery apparatus 8; transporting the holder 1 in its entirety to the vicinity of a mounting location with the plurality of pillars 3 still held thereon; and then picking up some or all of the plurality of pillars 3 and mounting the pillars 3 onto the substrate 91. The pillar delivery step will be described in further detail later.

Figure 8:
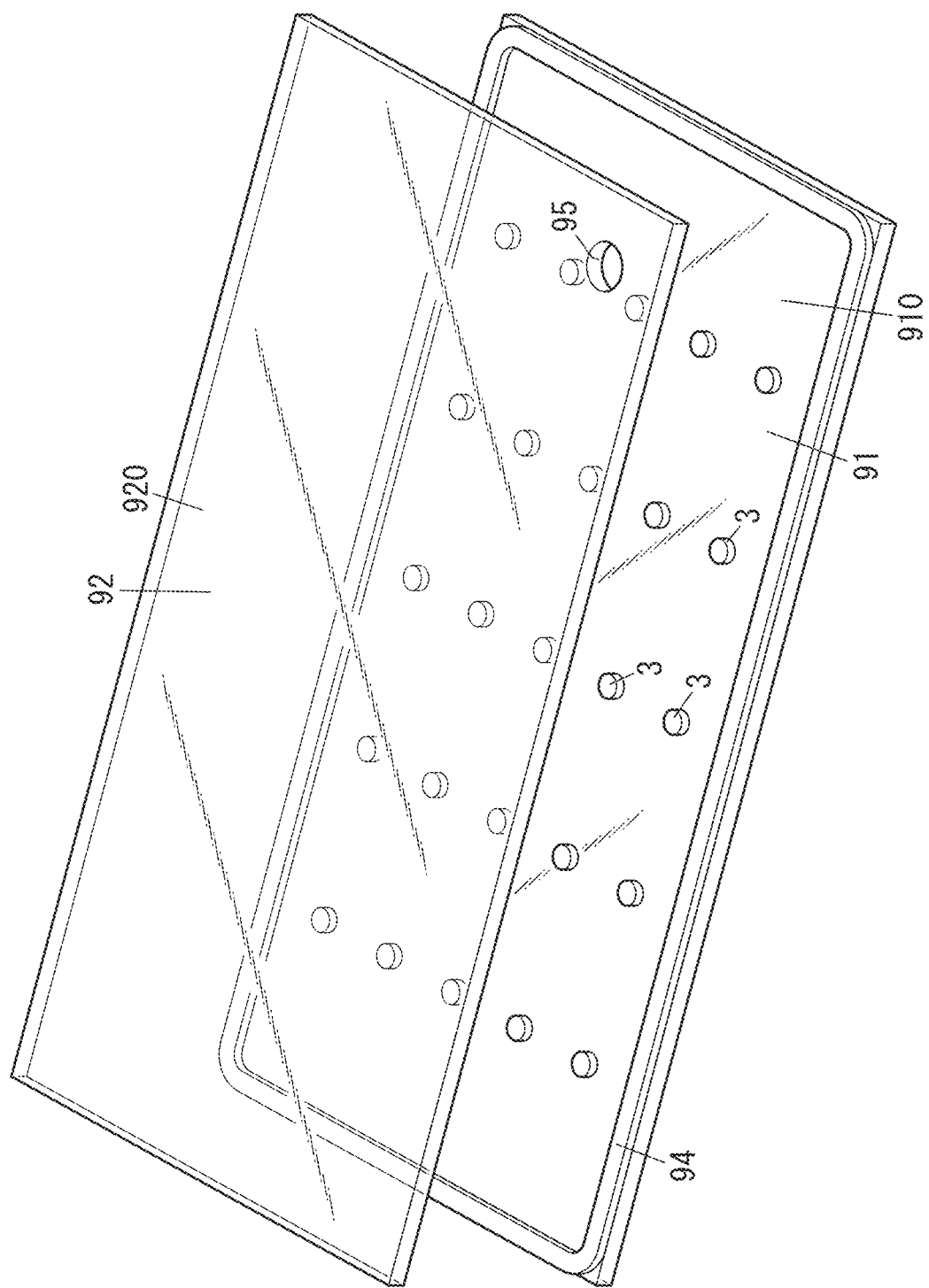
FIG. 8 is a perspective view illustrating an arrangement step of the manufacturing method.

The arrangement step includes arranging another substrate 92 including a glass panel 920 (hereinafter referred to as a "counter substrate 92") with respect to the substrate 91 on which the plurality of pillars 3 have been mounted such that the counter substrate 92 is laid over the plurality of pillars 3 (see FIG. 8), thus sandwiching the plurality of pillars 3 between the pair of substrates 91, 92. Before the substrate 92 is laid over the substrate 91, a sealing member 94 in a frame shape is arranged on the upper surface of the substrate 91. The sealing member 94 may be glass paste, for example.

The sealing member 94 may be arranged either after the plurality of pillars 3 have been mounted onto the substrate 91 or before the plurality of pillars 3 are mounted onto the substrate 91, whichever is appropriate. Alternatively, mounting the plurality of pillars 3 on the substrate 91 and arranging the sealing member 94 on the substrate 91 may be performed in parallel with each other.

Figure 9:
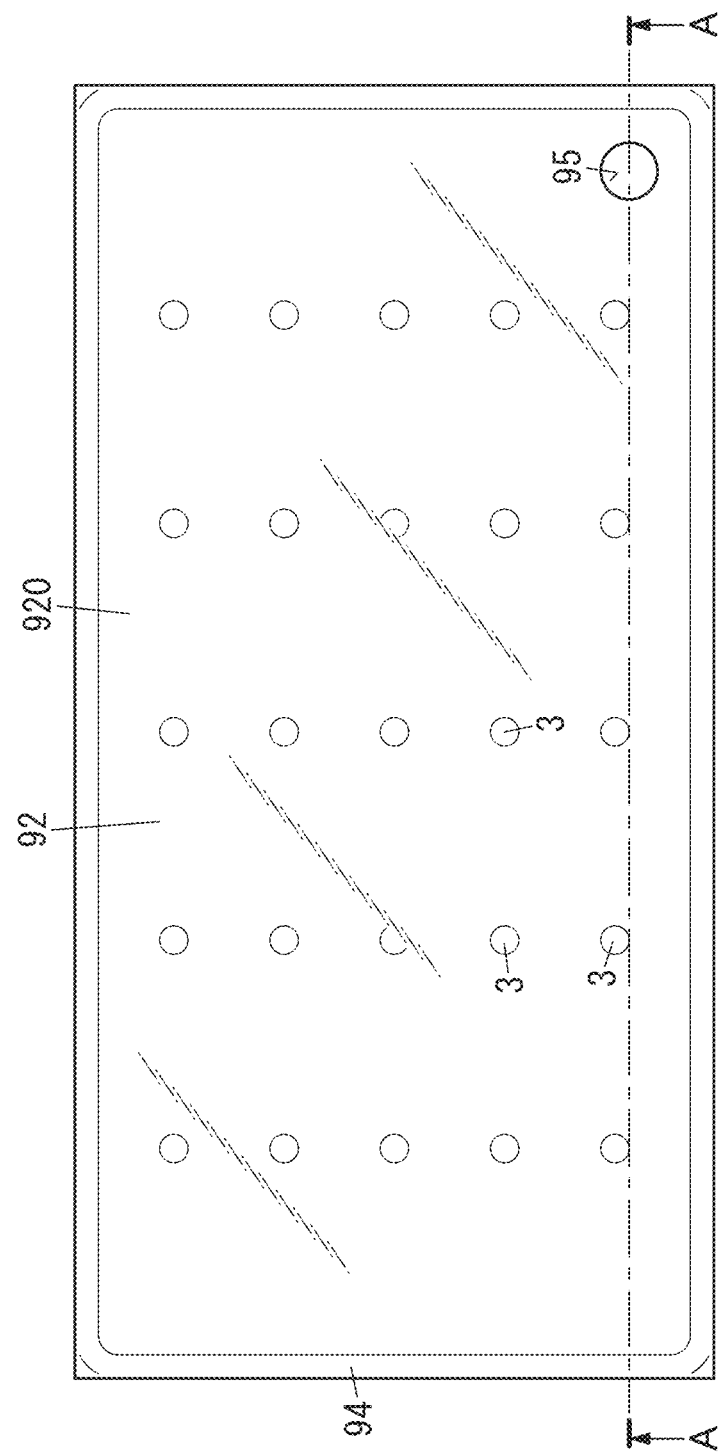
FIG. 9 is a plan view illustrating a bonding step of the manufacturing method.
Figure 10:
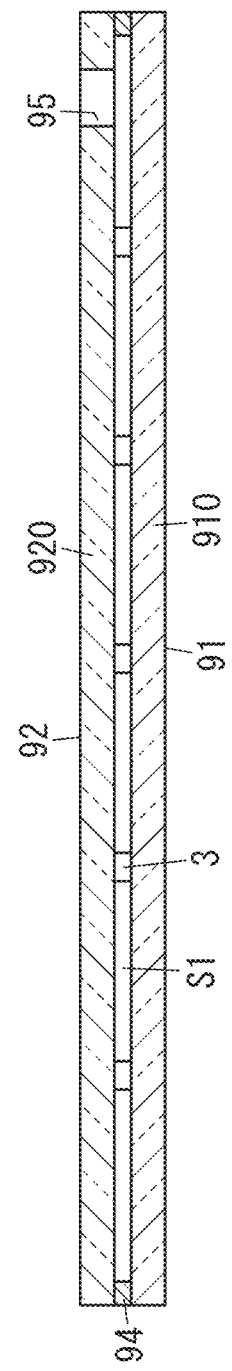
FIG. 10 is a cross-sectional view thereof taken along a plane A-A shown in FIG. 9.

The bonding step includes hermetically bonding respective peripheral edges of the substrates 91, 92 together with the sealing member 94 in the frame shape. This allows an internal space S1 to be formed between the pair of substrates 91, 92 that are arranged to face each other and the sealing member 94. The plurality of pillars 3 are located in the internal space S1 (see FIGS. 9 and 10).

The plurality of pillars 3 are positioned to abut on the respective surfaces, facing each other, of the pair of substrates 91,92. The plurality of pillars 3 are located in a region surrounded with the sealing member 94 in the frame shape to serve as spacers that maintain a predetermined gap distance between the pair of substrates 91, 92.

Figure 11A:
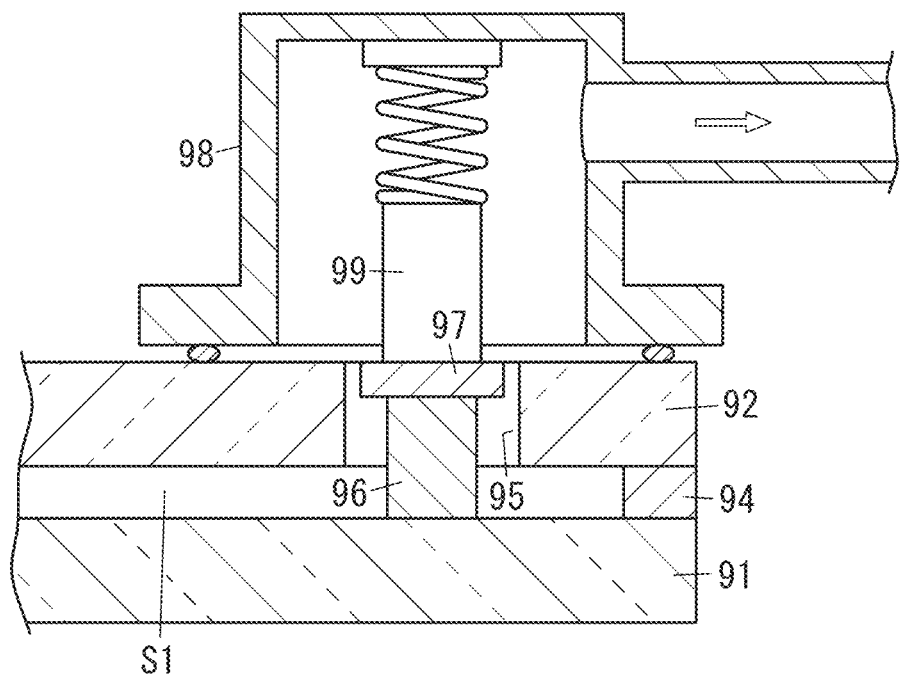
FIG. 11A is a cross-sectional view of a principal part illustrating an evacuation step of the manufacturing method.

The evacuation step includes evacuating the internal space S1 through an evacuation port 95 provided through the substrate 92 (see FIG. 11A). In the evacuation step, a sealant 96 and a plate 97 are inserted in this order into the evacuation port 95 to evacuate the internal space S1. The sealant 96 may be a solid sealant made of a glass frit, for example.

Next, an evacuation head 98 is pressed against a region, surrounding the opening of the evacuation port 95, of the substrate 92 to maintain an airtight condition with respect to the substrate 92. At this time, the sealant 96 and the plate 97 are forced elastically toward the substrate 91 by a spring mechanism 99 that the evacuation head 98 includes.

Sucking the air up from inside the evacuation head 98 in this state (as indicated by the open arrow in FIG. 11A) causes the air in the internal space S1 to be evacuated through the evacuation port 95.

Figure 11B:
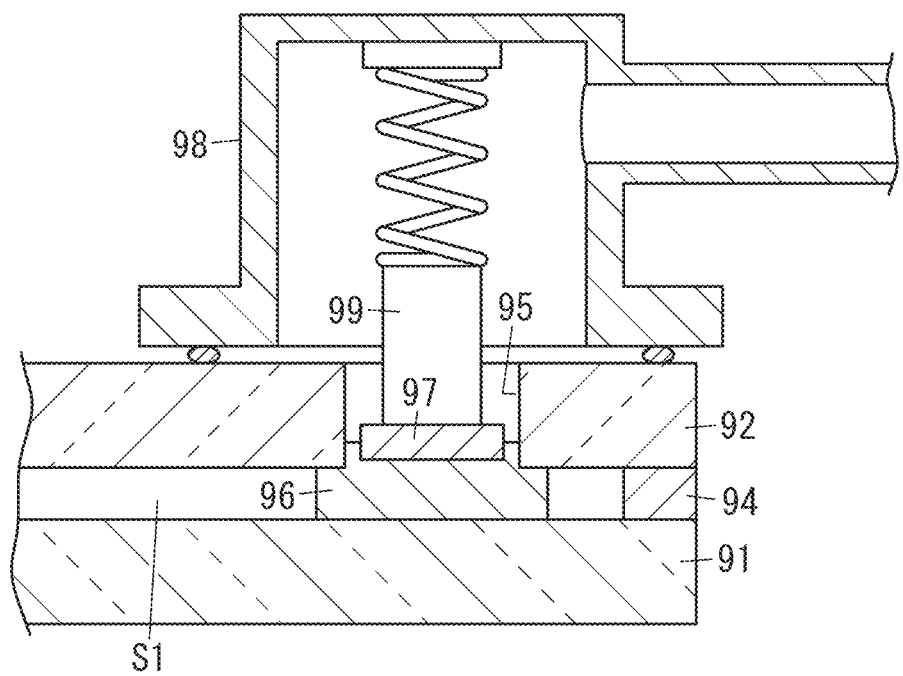
FIG. 11B is a cross-sectional view of a principal part illustrating a sealing step of the manufacturing method.

The sealing step includes sealing the internal space S1 up with the sealant 96 while keeping the internal space S1 evacuated (see FIG. 11B).

The sealing step includes softening the sealant 96 by locally heating the sealant 96. The sealant 96 may be locally heated by, for example, being irradiated with an infrared ray or a laser beam or being inductively heated. The sealant 96 that has been softened by being locally heated is deformed inside the internal space S1 under the biasing force applied by the spring mechanism 99. The sealant 96 thus deformed seals the evacuation port 95 up.

Figure 12:
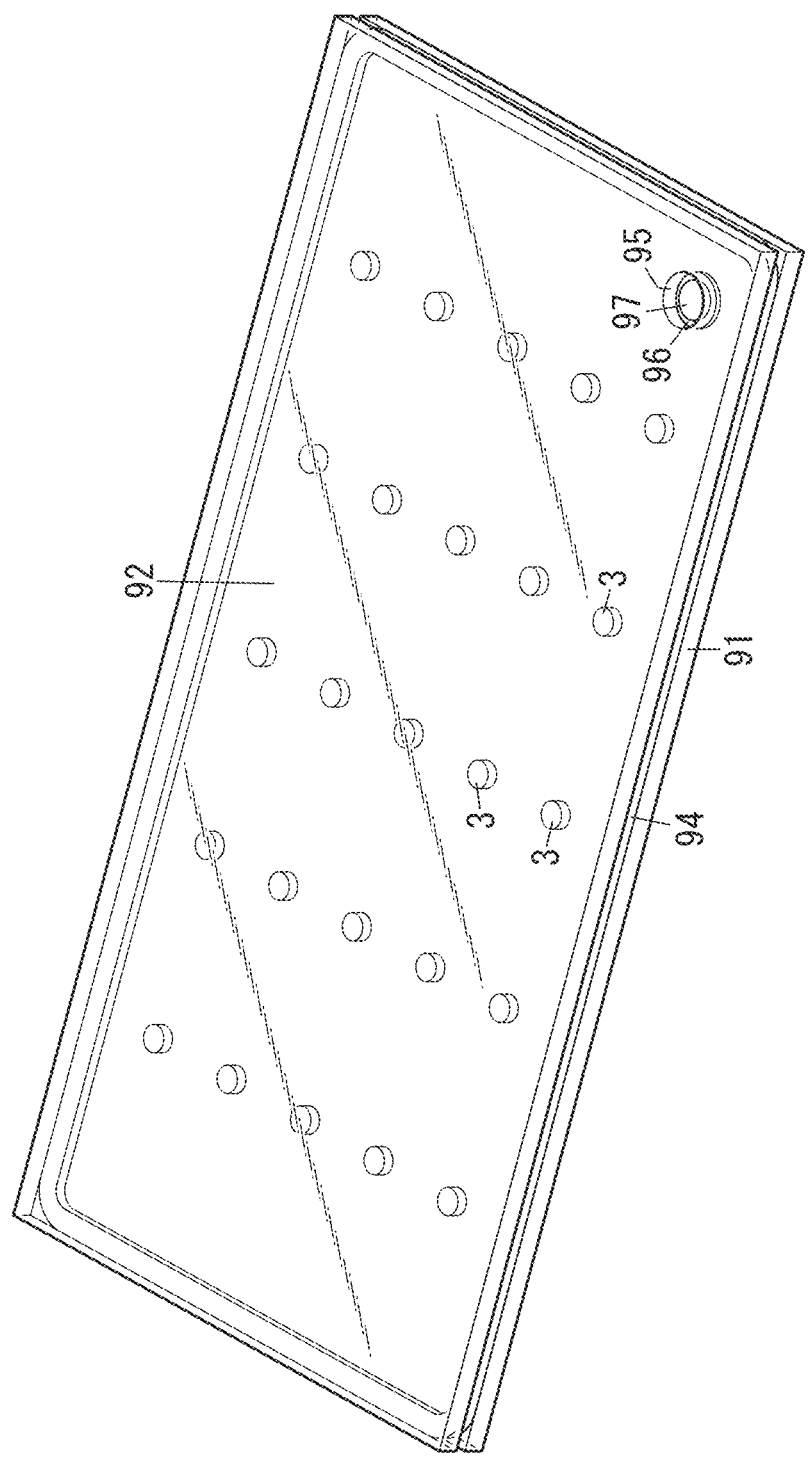
FIG. 12 is a perspective view illustrating a glass panel unit manufactured by the manufacturing method.

A glass panel composite is formed through these manufacturing process steps. The glass panel composite may be provided as glass panel unit with excellent thermal insulation properties (see FIG. 12). Optionally, another glass substrate may be further stacked on top of the glass panel composite formed through the same manufacturing process steps and the stack may be provided as a glass panel unit. Alternatively, part of the glass panel composite formed through the same manufacturing process steps may be cut off and the rest may be provided as a glass panel unit.

Next, the pillar delivery step will be described in detail with reference to FIGS. 1-7.

The pillar delivery step includes forming a plurality of pillars 3 by laser cutting and sequentially delivering the plurality of pillars 3 thus formed onto the substrate 91 using the pillar delivery apparatus 8.

First, the structure of the pillar delivery apparatus 8 will be described. The pillar delivery apparatus 8 includes a holder 1, a transport mechanism 7, a sheet 2, a laser cutter 4, and a mounter 5. The pillar delivery apparatus 8 further includes a supporting mechanism 6 for supporting the substrate 91 such that the substrate 91 is displaceable along a first axis A1. The first axis A1 is a virtual axis that extends linearly in a plan view (i.e., when the pillar delivery apparatus 8 is viewed from over the apparatus).

Figure 2:
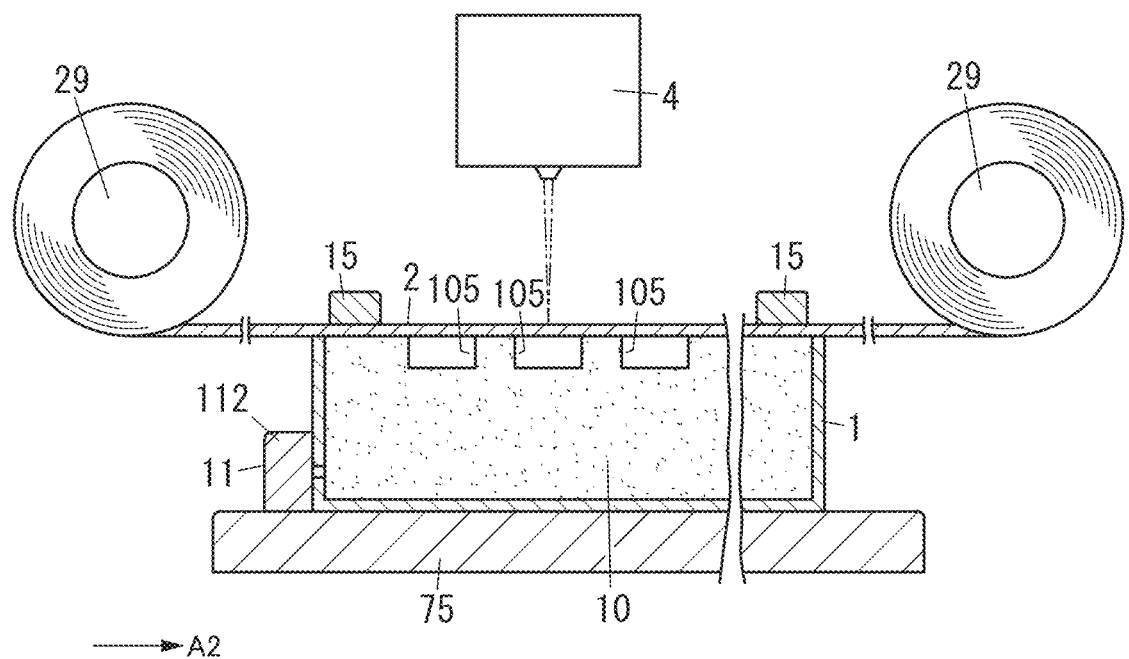
FIG. 2 is a partially cutaway side view illustrating how a principal part of the pillar delivery apparatus works while irradiating the workpiece with a laser beam.
Figure 3:
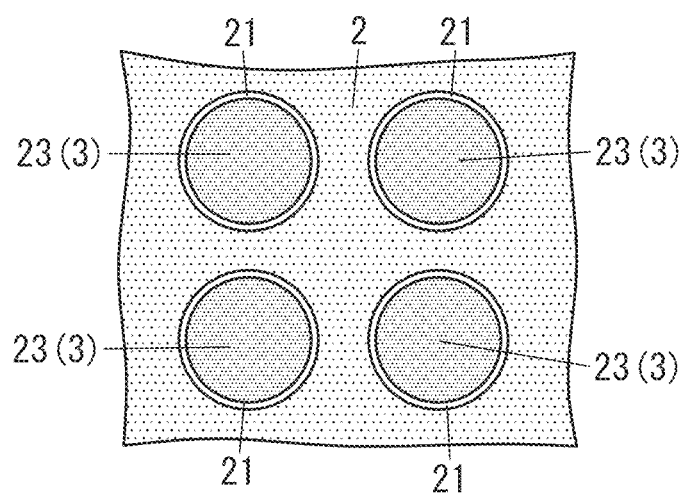
FIG. 3 is a plan view illustrating a main part of a sheet included in the pillar delivery apparatus.

The holder 1 includes: a body 10 including a porous material; and a suctioning mechanism 11 with the ability to have the plurality of pillars 3 suctioned onto the body 10 (see, for example, FIG. 2).

The upper surface of the body 10 is provided with a plurality of grooves 105. Each of the grooves 105 is a bottomed groove, of which the upside is open. The plurality of grooves 105 are arranged in matrix on the upper surface of the holder 1 (i.e., on the upper surface of the body 10) to be spaced apart from each other.

The suctioning mechanism 11 includes an air sucking device 112 connected to the body 10. The air sucking device 112 may be implemented as, for example, an air sucking fan. The air sucking device 112 is configured to suck the air up through a part of the holder 1. More specifically, the air sucking device 112 is configured to suck up the air from inside micropores that the body 10 has. Activating the air sucking device 112 causes the pillars 3 in the grooves 105 to be suctioned onto the inner surface of the grooves 105 (see, for example, FIG. 4).

The transport mechanism 7 includes: a delivery stage 75 for supporting the holder 1 thereon; a supporting portion 71 (see, for example, FIG. 5) for supporting the delivery stage 75 such that the delivery stage 75 is movable along a second axis A2; and a displacement operating member 72 (see FIG. 6) for displacing the delivery stage 75 along the first axis A1. The second axis A2 is a virtual axis extending linearly and perpendicularly to the first axis A1 in a plan view (i.e., when the pillar delivery apparatus 8 is viewed from over the apparatus).

The sheet 2 is a flexible sheet for use to form the plurality of pillars 3. The sheet 2 is suitably made of a resin (such as polyimide) but may also be made of a metallic material.

The sheet 2 is wound around a pair of rollers 29, which are arranged to be spaced from each other, and given tension between the pair of rollers 29 (see FIG. 2). The sheet 2 and the rollers 29 that support the sheet 2 are spaced apart from each other in a direction aligned with the second axis A2 with respect to the substrate 91.

The laser cutter 4 is arranged to be spaced apart from the substrate 91 in a direction aligned with the second axis A2. The laser cutter 4 is located over the pillar forming sheet 2. The laser cutter 4 is configured to radiate a laser beam downward (i.e., toward the sheet 2).

The mounter 5 includes a mounting head 51 and a supporting portion 53 for supporting the mounting head 51 such that the mounting head 51 is movable along the second axis A2. The mounting head 51 and the supporting portion 53 are arranged over the substrate 91. The mounting head 51 includes a plurality of suction nozzles 515 (see FIGS. 7A and 7B). Each of the plurality of suction nozzles 515 has a tip opening and sucks the air up through the tip opening, thereby suctioning one of the pillars 3 onto the tip opening. Each of the plurality of suction nozzles 515 lets the air out through the tip opening thereof to release the pillar 3 that has been suctioned onto the tip opening.

Next, it will be described how to perform the pillar delivery step using the pillar delivery apparatus 8 described above. In other words, it will be described how to perform the pillar delivery method. The pillar delivery step includes an irradiation step, a holding step, a transporting step, and a mounting step.

The irradiation step includes setting the sheet 2 on the holder 1 at a location adjacent to the substrate 91 in the direction aligned with the second axis A2 and positioning the laser cutter 4 over the sheet 2. At this time, part of the sheet 2 is suitably pressed against the upper surface of the holder 1 by a pressing member 15.

In the irradiation step, the plurality of grooves 105 of the holder 1 are located under the sheet 2. That is to say, the plurality of grooves 5 are covered with the sheet 2 at the top.

In this state, the sheet 2 is irradiated at multiple points with a laser beam emitted from the laser cutter 4, thereby making annular cuts 21 at the multiple points on the sheet 2. The cuts 21 run through the sheet 2 along the thickness thereof (i.e., in the upward/downward direction). This allows portions 23 surrounded with the cuts 21 to be punched out of the sheet 2 (see FIG. 3). The plurality of portions 23 punched out of the sheet 2 constitute the plurality of pillars 3.

The plurality of circular columnar portions 23 punched out of the sheet 2 (i.e., the plurality of pillars 3) fall by themselves due to their own weight into the plurality of grooves 105 located under those portions 23.

Figure 4:
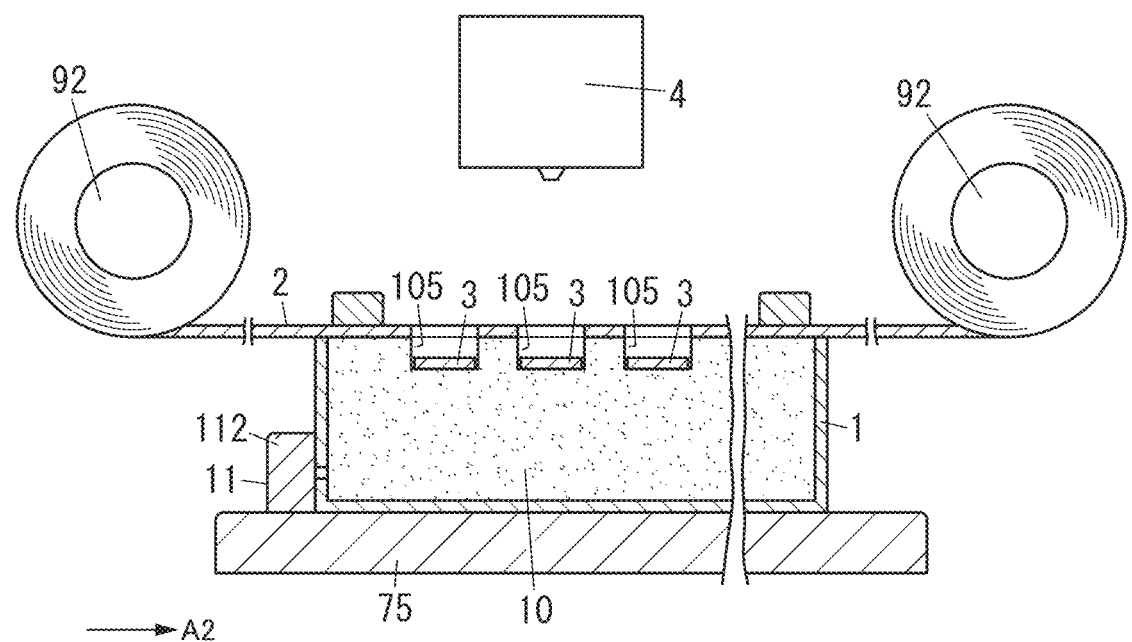
FIG. 4 is a partially cutaway side view illustrating how a principal part of the pillar delivery apparatus works while suctioning a plurality of pillars.

Performing this irradiation step allows the plurality of pillars 3, of which the entire periphery has been subjected to the laser cutting process, to be put one to one into the plurality of grooves 105 that the holder 1 has (see, for example, FIG. 4).

The holding step includes having the plurality of pillars 3, which have been cut out and have fallen into the plurality of grooves 105, suctioned onto the holder 1 by a negative pressure produced by the air sucking device 112 such that the plurality of pillars 3 are held one to one in the plurality of grooves 105. The air sucking device 112 may be activated either during the irradiation step (i.e., while the pillars 3 are being formed by laser cutting) or after the irradiation step has been finished, whichever is appropriate.

Alternatively, the air sucking device 112 may be provided for the delivery stage 75, instead of the holder 1. In that case, the air sucking device 112 needs to be arranged at such a position where the air sucking device 112 may suck up the air in micropores of the holder 1 with the holder 1 placed on the delivery stage 75.

In the transporting step, the delivery stage 75 for supporting the holder 1 from under the holder 1 horizontally moves the holder 1 and the plurality of pillars 3 held by the holder 1.

Figure 5:
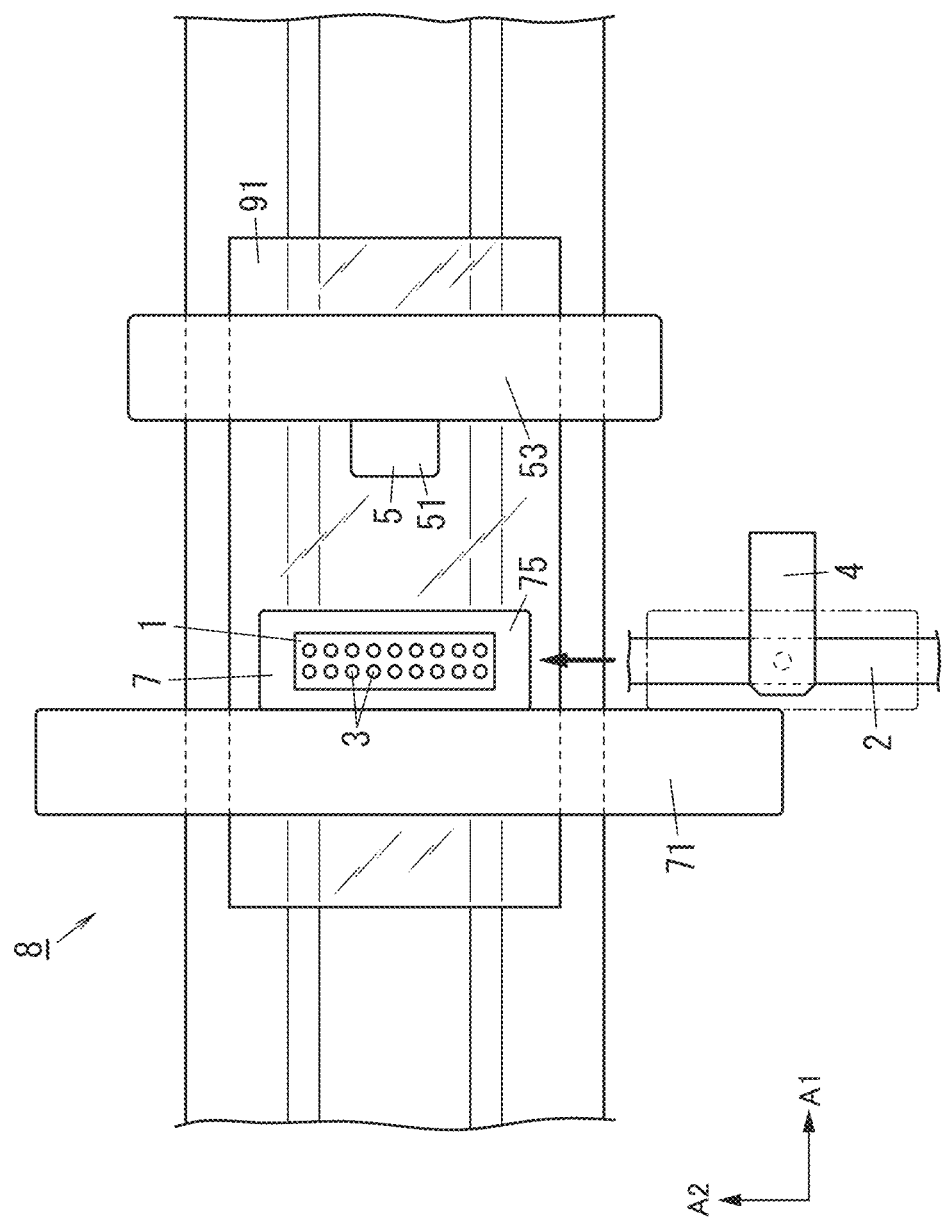
FIG. 5 is a plan view illustrating a first stage of transportation of a holder by the pillar delivery apparatus.
Figure 6:
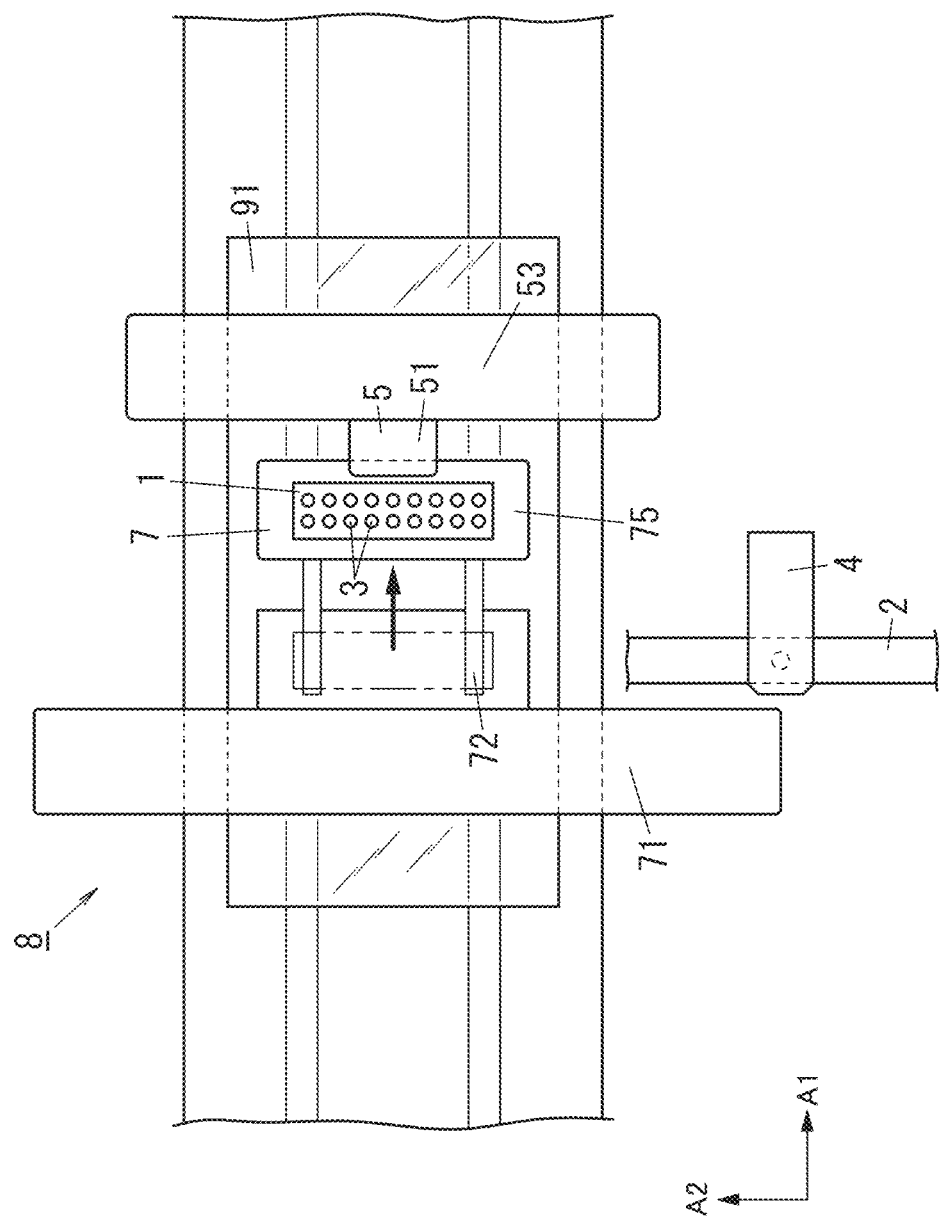
FIG. 6 is a plan view illustrating a second stage of transportation of the holder by the pillar delivery apparatus.

For example, first, the delivery stage 75 moves along the second axis A2 to a position over the substrate 91 as shown in FIG. 5. Next, the delivery stage 75 moves along the first axis A1 toward the mounter 5 as shown in FIG. 6.

That is to say, the transport mechanism 7 transports the holder 1 and the plurality of pillars 3 held by the holder 1 along the second axis A2 to a position over the substrate 91 and then transports the holder 1 and the plurality of pillars 3 along the first axis A1 toward the mounter 5 by driving the delivery stage 75.

During this transporting step, the air sucking device 112 is suitably activated continuously. That is to say, the holder 1 is suitably transported to the vicinity of a location where the plurality of pillars 3 are mounted while the plurality of pillars 3 are suctioned onto the upper surface of the holder 1. In the vicinity of the location where the plurality of pillars 3 are mounted, the mounting head 51 of the mounter 5 is located.

The mounting step includes picking up the plurality of pillars 3 from the holder 1 thus transported and mounting the plurality of pillars 3 onto the upper surface of the substrate 91 using the mounter 5.

Figure 7A:
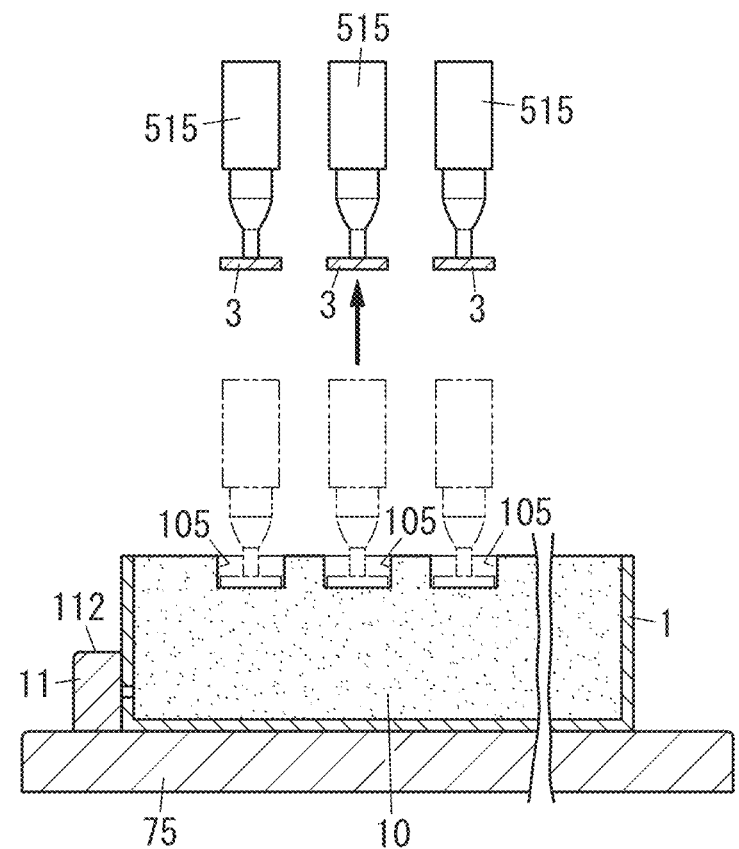
FIG. 7A is a partially cutaway side view illustrating how a principal part of the pillar delivery apparatus works while picking up a plurality of pillars.
Figure 7B:
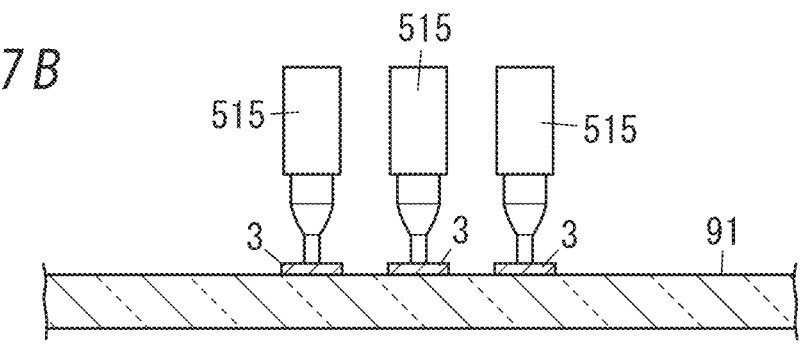
FIG. 7B is a side view illustrating how a principal part of the pillar delivery apparatus works while mounting the plurality of pillars.

Specifically, the plurality of suction nozzles 515 of the mounting head 51 suctions and lifts the plurality of pillars 3 held in the plurality of grooves 105 in the holder 1 (see FIG. 7A). At this time, the air sucking device 112 is suitably deactivated.

Next, at least one of the mounting head 51 or the substrate 91 is moved. At a timing when the plurality of pillars 3 reach the target positions with respect to the substrate 91, the plurality of pillars 3 are released from the mounting head 51 to be mounted onto the upper surface of the substrate 91 (see FIG. 7B).

In the pillar delivery step, the irradiation step, the holding step, the transporting step, and the mounting step described above are performed repeatedly, thereby delivering the plurality of pillars 3 onto the upper surface of the substrate 91 such that the pillars 3 are placed at their respective predetermined positions.

The respective pillars 3 delivered onto the substrate 91 will have significantly reduced burr, because the pillars 3 are portions 23 that have been punched out of the sheet 2 by laser cutting. In addition, the plurality of pillars 3 are formed in the vicinity of the substrate 91 and sequentially mounted onto the substrate 91. This eliminates the need to form a plurality of pillars 3 by laser cutting at one location and then stock the pillars 3 at another location. This allows the plurality of pillars 3 to be efficiently delivered onto the substrate 91.

(Variations)

As will be described by way of illustrative examples, the glass panel unit manufacturing method, pillar delivery method, and pillar delivery apparatus 8 described above may be modified as appropriate in various manners depending on a design choice or any other factor. In the following description, any constituent element, having the same function as a counterpart of the exemplary embodiment described above, will be designated by the same reference numeral as that counterpart's, and a detailed description thereof will be omitted herein.

For example, according to the method for manufacturing a glass panel unit described above, arrangement of a getter that may adsorb gas molecules is omitted. However, this is only an example of the present disclosure and should not be construed as limiting. Alternatively, the getter may be arranged in the internal space S1.

Also, according to the method for manufacturing a glass panel unit described above, the evacuation port 95 for evacuating the internal space S1 is provided through the substrate 92, out of the pair of substrates 91, 92. However, this is only an example of the present disclosure and should not be construed as limiting. Alternatively, the evacuation port 95 may be provided through the substrate 91.

Furthermore, in the sealing step of the method for manufacturing a glass panel unit described above, the internal space S1 is sealed up by locally heating the sealant 96 inserted into the evacuation port 95. However, this is not the only means for sealing the internal space S1. Alternatively, part of the sealing member 94 for hermetically bonding the pair of substrates 91, 92 together may be deformed by heating, for example, with the internal space S1 kept evacuated and the internal space S1 may be sealed with the deformed part of the sealing member 94. Still alternatively, a glass tube may be connected to the substrate 92 to communicate with the evacuation port 95, the internal space S1 may be evacuated through the glass tube, and then the glass tube may be sealed by heating, for example.

Furthermore, in the pillar delivery apparatus 8 described above, the holder 1 includes both the suctioning mechanism 11 and the plurality of grooves 105. However, the holder 1 does not have to include both the suctioning mechanism 11 and the plurality of grooves 105. Alternatively, the pillar delivery apparatus 8 may include either the suctioning mechanism 11 or the plurality of grooves 105.

For example, if the holder 1 includes the suctioning mechanism 11 but has no grooves 105, then the holder 1 may have a flat upper surface. In that case, the plurality of pillars 3 put on the flat upper surface may be transported while being suctioned onto the holder 1 by a negative pressure produced by the air sucking device 112.

If the holder 1 has the plurality of grooves 105 but does not include the suctioning mechanism 11, then the plurality of pillars 3 may be transported while being put in the plurality of grooves 105.

Furthermore, the pillar delivery apparatus 8 described above includes a single holder 1, a single delivery stage 75, a single sheet 2, a single laser cutter 4, and a single mounter 5. However, the number of each of these members provided does not have to be one. If the number of each of these members provided is plural, then the plurality of pillars 3 may be formed by laser cutting at multiple locations adjacent to the substrate 91 and those pillars 3 formed at the respective locations may be sequentially delivered onto the substrate 91.

Figure 13:
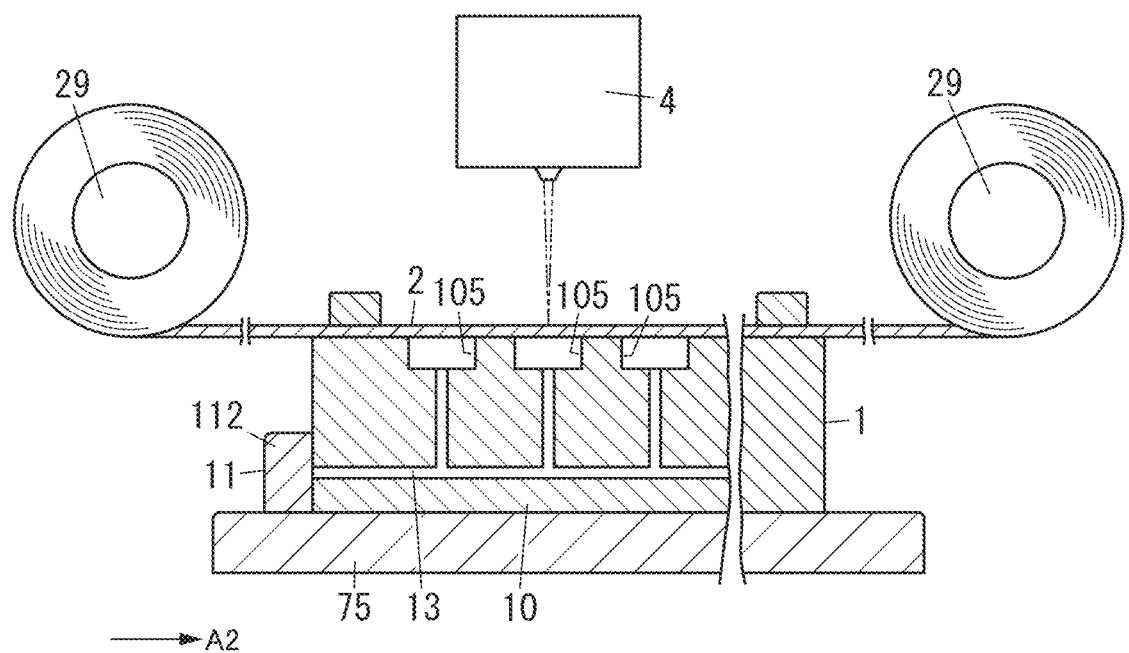
FIG. 13 is a partially cutaway side view illustrating how a principal part of a pillar delivery apparatus according to a first variation works while irradiating the workpiece with a laser beam.

Furthermore, in the pillar delivery apparatus 8 described above, the body 10 has porosity. Alternatively, as in a first variation illustrated in FIG. 13, an air sucking path 13 communicating with each of the plurality of grooves 105 may be provided inside the body 10 and may be connected to the air sucking device 112. The air sucking path 13 suitably communicates with the bottom of each groove 105.

Figure 14:
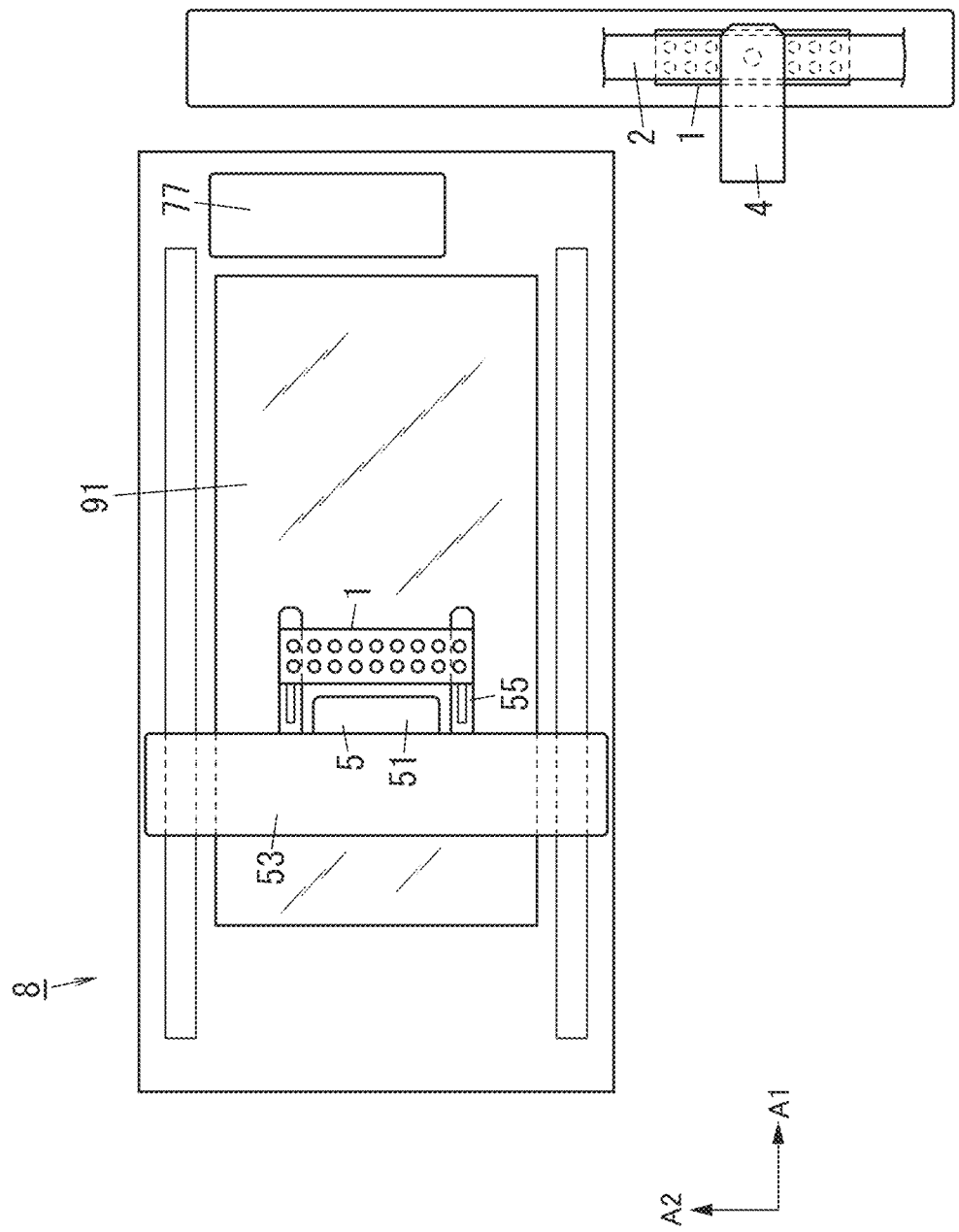
FIG. 14 is a plan view schematically illustrating a pillar delivery apparatus according to a second variation.
Figure 15:
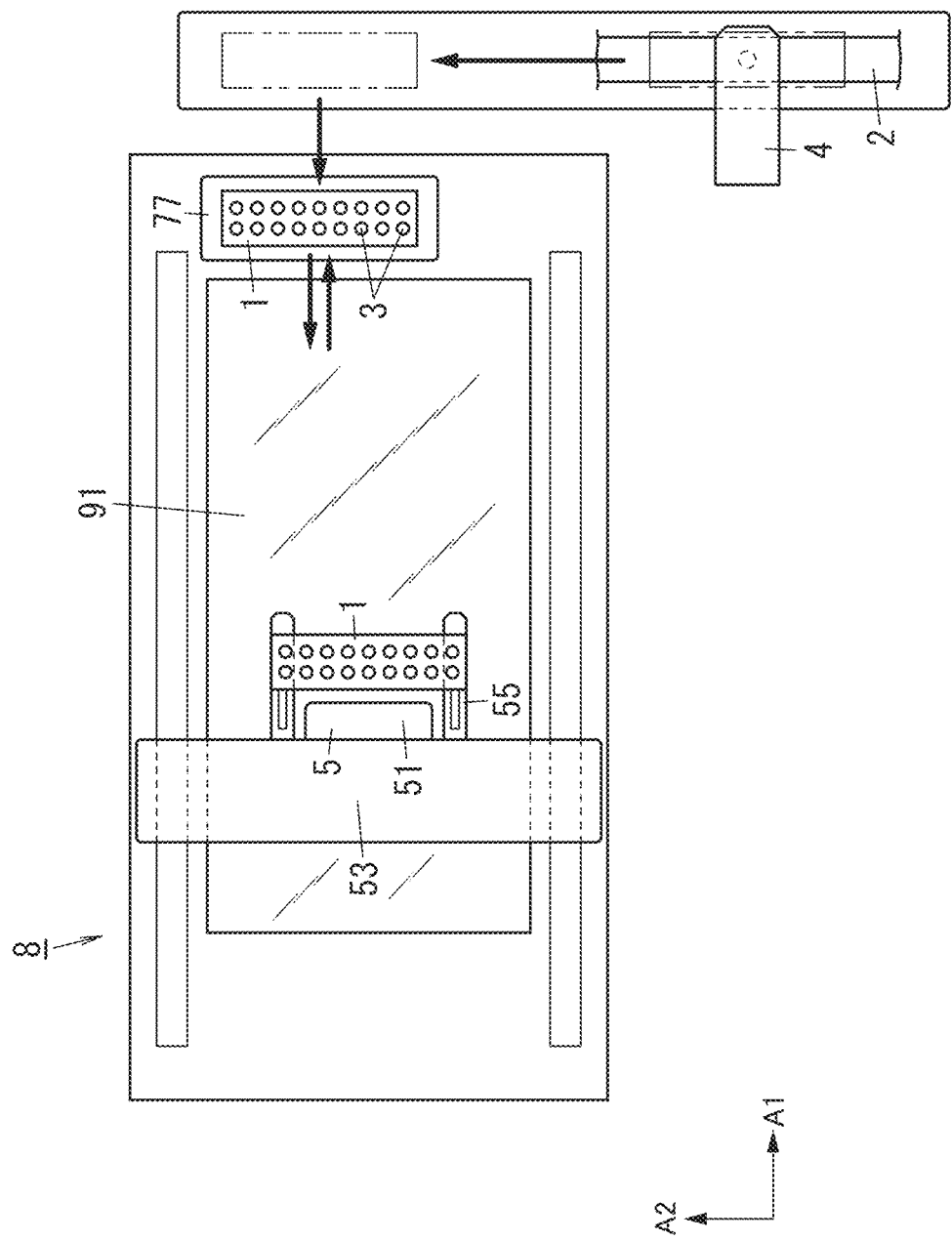
FIG. 15 is a plan view illustrating how the pillar delivery apparatus according to the second variation transports a holder.

Furthermore, in the pillar delivery apparatus 8 described above, the holder 1 that holds the plurality of pillars 3 thereon is transported via the delivery stage 75. Alternatively, the holder 1 may also be transported without using the delivery stage 75 as in a second variation shown in FIGS. 14 and 15. The holder 1 is suitably transported by an appropriate transport mechanism but may be moved manually by the operator.

According to the second variation, the mounter 5 includes an attachment portion 55 to which the holder 1 is attachable removably. The mounting head 51 and the attachment portion 55 are coupled to the supporting portion 53 to be movable along the second axis A2. The supporting portion 53 is displaceable along the first axis A1 with respect to the substrate 91.

Thus, the mounting head 51 and the attachment portion 55 (and the holder 1 attached to the attachment portion 55) are displaceable along the first axis A1 and the second axis A2 with respect to the substrate 91. The holder 1 attached to the attachment portion 55 is displaceable along the first axis A1 with respect to the mounting head 51.

In the second variation, an exchange stage 77 is provided adjacent to the substrate 91 in the direction aligned with the first axis A1. The holder 1 for holding the plurality of pillars 3 is transported from under the laser cutter 4 and the sheet 2 to a location near the exchange stage 77 and transferred onto the exchange stage 77 (see FIG. 15).

The holder 1 transferred onto the exchange stage 77 (i.e., the holder 1 that currently holds the plurality of pillars 3 thereon) may be exchanged with another holder 1 attached to the mounter 5 (i.e., the holder 1 from which the plurality of pillars 3 have been picked up by the mounting head 51).

According to the second variation, repeatedly performing the step of sequentially delivering the holder 1 that currently holds the plurality of pillars 3 thereon onto the exchange stage 77 and exchanging the holder 1 with another holder 1 attached to the mounter 5 allows the plurality of pillars 3 to be delivered efficiently onto the substrate 91.

Figure 16:
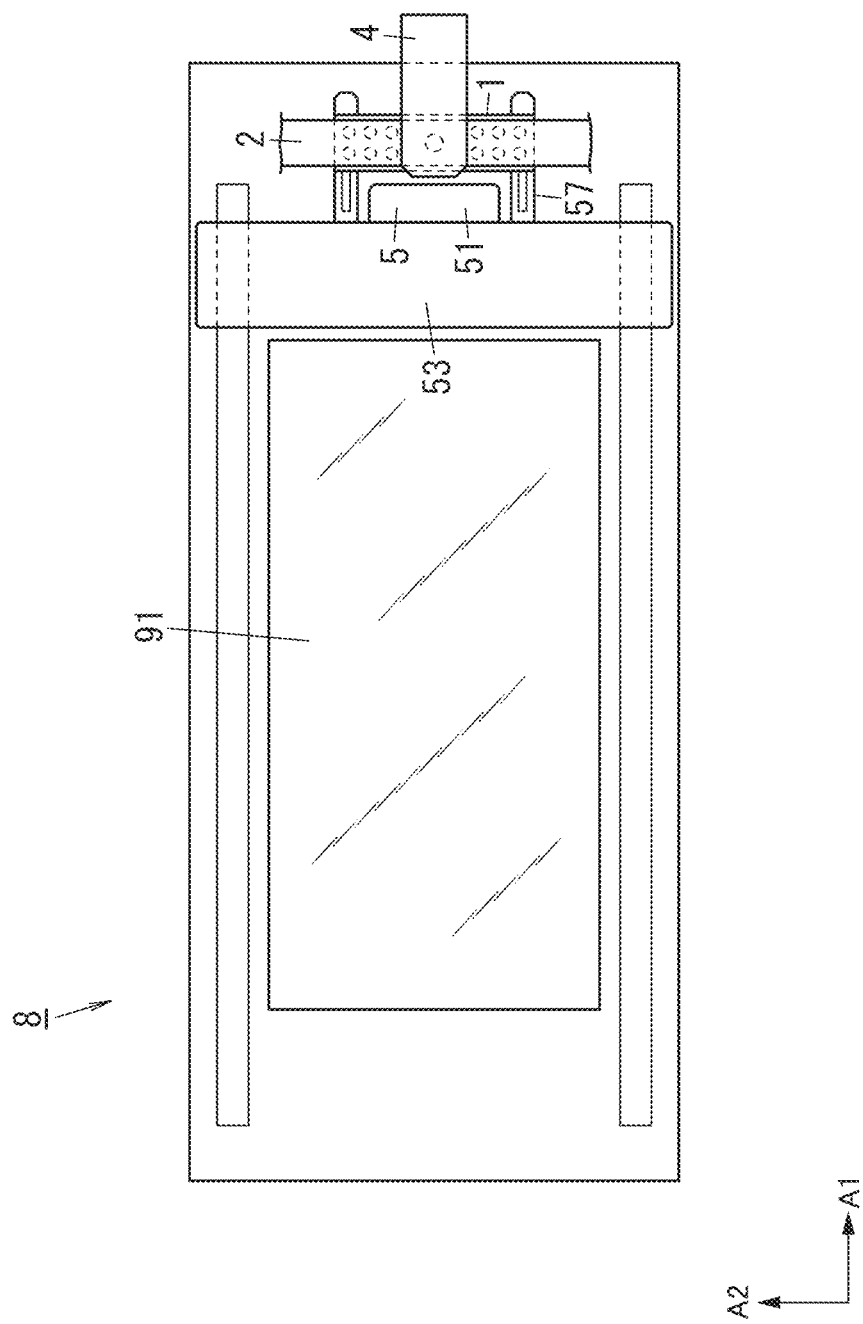
FIG. 16 is a plan view schematically illustrating a pillar delivery apparatus according to a third variation.
Figure 17:
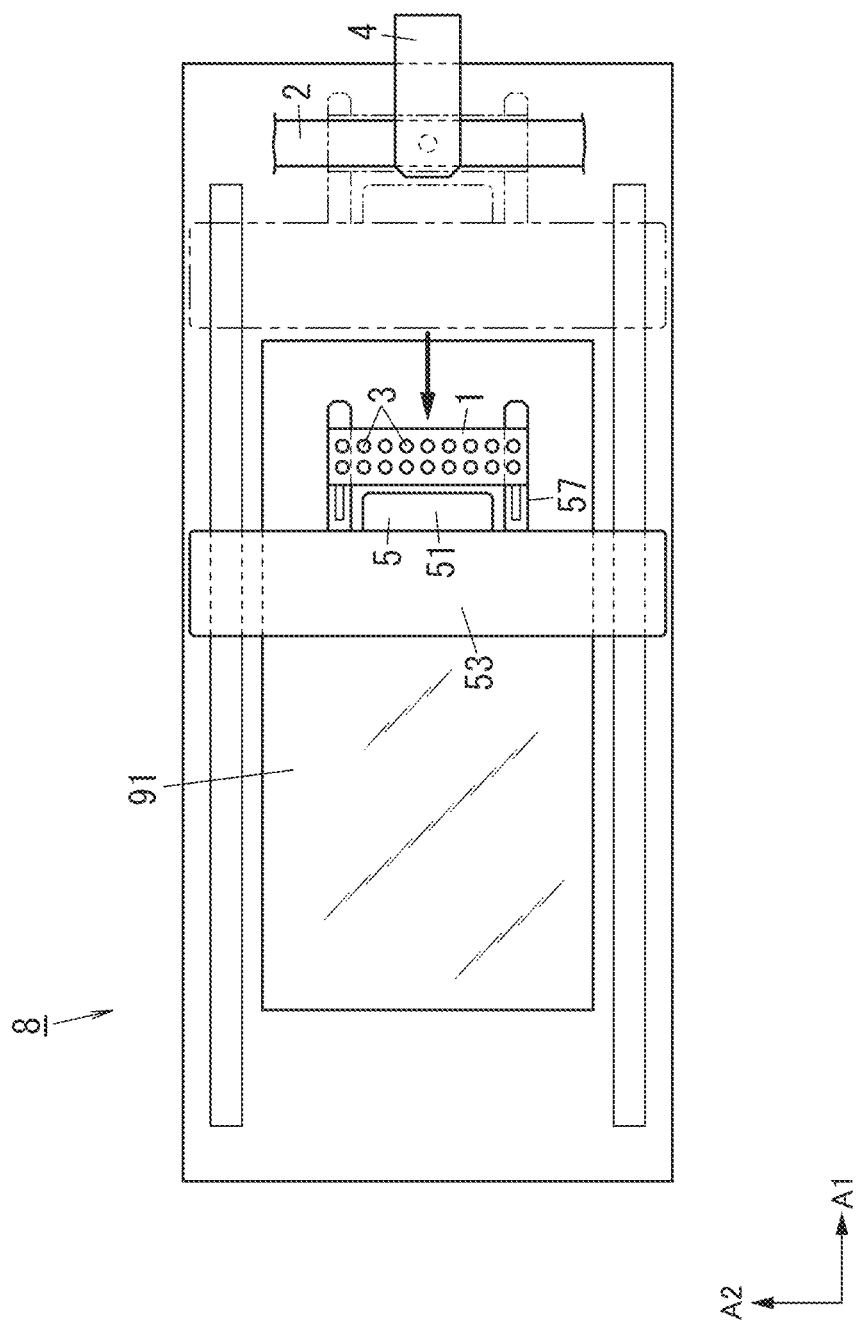
FIG. 17 is a plan view illustrating how the pillar delivery apparatus according to the third variation transports a holder.

Optionally, the laser cutting may be performed with the holder 1 attached to the mounter 5 as in a third variation shown in FIGS. 16 and 17.

According to the third variation, the mounter 5 includes an attachment member 57 to which the holder 1 may be attached. The mounting head 51 and the attachment member 57 are coupled to the supporting portion 53 to be movable along the second axis A2. The supporting portion 53 is displaceable along the first axis A1.

Thus, the mounting head 51 and the attachment member 57 (and the holder 1 attached to the attachment member 57) are movable along the first axis A1 and the second axis A2 with respect to the substrate 91. The holder 1 attached to the attachment member 57 is displaceable along the first axis A1 with respect to the mounting head 51.

In the third variation, the laser cutter 4 and the sheet 2 are arranged at a location adjacent to the substrate 91 in the direction aligned with the first axis A1.

According to the third variation, with the holder 1 attached to the mounter 5, the irradiation step is performed at a location adjacent to the substrate 91 (see FIG. 16). In the transporting step, the mounter 5 is transported in its entirety along the first axis A1 with the holder 1 that holds the plurality of pillars 3 still attached thereto (see FIG. 17). In the mounting step, the mounter 5 that has transported picks up the plurality of pillars 3 from the holder 1 and mounts the pillars 3 onto the substrate 91. The third variation achieves the advantages of facilitating the use of an existent facility and reducing the overall installation area of the pillar delivery apparatus 8.

(Implementations)

As can be seen from the foregoing description of embodiments and their variations, a first implementation of a pillar delivery method has the following features:

A first implementation of the pillar delivery method is a method for delivering a plurality of pillars (3) onto a substrate (91), including a glass panel (910), to manufacture a glass panel unit. The method includes an irradiation step, a holding step, and a mounting step. The irradiation step includes setting, over a holder (1), a sheet (2) for use to form pillars and irradiating the sheet (2) with a laser beam to punch out the plurality of pillars (3). The holding step includes having the plurality of pillars (3), which have been punched out of the sheet (2), held by the holder (1). The mounting step includes picking up some or all of the plurality of pillars (3) from the holder (1) and mounting the pillars (3) onto the substrate (91).

The pillar delivery method according to the first implementation allows a plurality of pillars (3), made by laser cutting with burr reduced significantly, to be efficiently delivered onto the substrate (91).

A second implementation of the pillar delivery method, which may be adopted in combination with the first implementation, has the following additional features. The pillar delivery method according to the second implementation further includes a transporting step. The transporting step includes transporting the holder (1) in its entirety with all of the plurality of pillars (3) still held by the holder (1). The mounting step includes picking up some or all of the plurality of pillars (3) from the holder (1) transported and mounting the pillars (3) onto the substrate (91).

The pillar delivery method according to the second implementation allows a plurality of pillars (3), made by laser cutting with burr reduced significantly, to be transported to the mounting location while being still held by the holder (1) and efficiently delivered onto the substrate (91).

A third implementation of the pillar delivery method, which may be adopted in combination with the first or second implementation, has the following additional features. In the pillar delivery method according to the third implementation, the holding step includes having the plurality of pillars (3), which have been punched out of the sheet (2), suctioned onto, and thereby held by, the holder (1).

The pillar delivery method according to the third implementation allows the plurality of pillars (3), which have been punched out of the sheet (2) by laser cutting, to be held with good stability by the holder (1).

A fourth implementation of the pillar delivery method, which may be adopted in combination with the third implementation, has the following additional features. In the pillar delivery method according to the fourth implementation, the holding step includes having the plurality of pillars (3) suctioned onto the holder (1) by sucking up the air through the holder (1).

The pillar delivery method according to the fourth implementation allows the plurality of pillars (3), which have been punched out of the sheet (2) by laser cutting, to be held with good stability by the holder (1) by sucking the air up.

A fifth implementation of the pillar delivery method, which may be adopted in combination with the fourth implementation, has the following additional features. In the pillar delivery method according to the fifth implementation, the holder (1) includes a body (10) with porosity.

The pillar delivery method according to the fifth implementation allows the plurality of pillars (3) to be held with good stability by the holder (1) by sucking the air up through the body (10) with porosity.

A sixth implementation of the pillar delivery method, which may be adopted in combination with the fourth implementation, has the following additional features. In the pillar delivery method according to the sixth implementation, the holder (1) includes a body (10) with an air sucking path (13).

The pillar delivery method according to the sixth implementation allows the plurality of pillars (3) to be held with good stability by the holder (1) by sucking the air up through the air sucking path (13).

A seventh implementation of the pillar delivery method, which may be adopted in combination with any one of the first to sixth implementations, has the following additional features. In the pillar delivery method according to the seventh aspect, the holding step includes having the plurality of pillars (3), which have been punched out of the sheet (2), received in, and held by, a plurality of grooves (105) provided on the holder (1).

The pillar delivery method according to the seventh implementation allows the plurality of pillars (3), which have been punched out of the sheet (2) by laser cutting, to be held with good stability by the holder (1).

An eighth implementation of the pillar delivery method, which may be adopted in combination with the third implementation, has the following additional features. In the pillar delivery method according to the eighth implementation, the holding step includes having the plurality of pillars (3), which have been punched out of the sheet (2), received in a plurality of grooves (105) provided on the holder (1), suctioned onto an inner surface of the plurality of grooves (105), and thereby held by the holder (1).

The pillar delivery method according to the eighth implementation allows the plurality of pillars (3), which have been punched out of the sheet (2) by laser cutting, to be held with good stability by the holder (1).

A first implementation of a method for manufacturing a glass panel unit includes a pillar delivery step, an arrangement step, a bonding step, an evacuation step, and a sealing step. The pillar delivery step includes delivering the plurality of pillars (3) onto the substrate (91) by any one of the first through eighth implementations of the pillar delivery method. The arrangement step includes laying a counter substrate (92), including a glass panel (920), over the substrate (91). The bonding step includes bonding respective peripheral edges of the substrate (91) and the counter substrate (92) together to form an internal space (S1) where the plurality of pillars (3) are located. The evacuation step includes evacuating the internal space (S1). The sealing step includes sealing the internal space (S1) while keeping the internal space (S) evacuated.

The method for manufacturing a glass panel unit according to the first implementation allows a glass panel unit, including a plurality of pillars (3) with significantly reduced burr, to be manufactured efficiently.

As can be seen from the foregoing description of embodiments and their variations, a first implementation of a pillar delivery apparatus (8) has the following configuration:

A first implementation of the pillar delivery apparatus (8) is an apparatus for delivering a plurality of pillars (3) onto a substrate (91), including a glass panel (910), to manufacture a glass panel unit. The pillar delivery apparatus (8)

according to the first implementation includes a holder (1), a sheet (2) for use to form pillars, a laser cutter (4), and a mounter (5). The sheet (2) is to be set over the holder (1). The laser cutter (4) is used to punch out the plurality of pillars (3) of the sheet (2) by irradiating the sheet (2) with a laser beam. The mounter (5) is used to pick up some or all of the plurality of pillars (3) held by the holder (1) and mount the pillars (3) onto the substrate (91).

The pillar delivery apparatus (8) according to the first implementation allows a plurality of pillars (3) formed by laser cutting with significantly reduced burr to be efficiently delivered onto the substrate (91).

A second implementation of the pillar delivery apparatus (8), which may be adopted in combination with the first implementation, has the following additional features. The pillar delivery apparatus (8) according to the second implementation further includes a suctioning mechanism (11) to have the plurality of pillars (3) suctioned onto the holder (1).

The pillar delivery apparatus (8) according to the second implementation allows a plurality of pillars (3) punched out of the sheet (2) by laser cutting to be held with good stability by the holder (1).

A third implementation of the pillar delivery apparatus (8), which may be adopted in combination with the second implementation, has the following additional features. In the pillar delivery apparatus (8) according to the third implementation, the suctioning mechanism (11) includes a sucking device (112) to suck the air up through the holder (1).

The pillar delivery apparatus (8) according to the third implementation allows a plurality of pillars (3) punched out of the sheet (2) by laser cutting to be held with good stability by the holder (1) by sucking the air up.

A fourth implementation of the pillar delivery apparatus (8), which may be adopted in combination with the third implementation, has the following additional features. In the pillar delivery apparatus (8) according to the fourth implementation, the holder (1) includes a body (10) with porosity.

The pillar delivery apparatus (8) according to the fourth implementation allows the plurality of pillars (3) to be held with good stability by the holder (1) by sucking the air up through the body (10) with porosity.

A fifth implementation of the pillar delivery apparatus (8), which may be adopted in combination with the third implementation, has the following additional features. In the pillar delivery apparatus (8) according to the fifth implementation, the holder (1) includes a body (10) with an air sucking path (13).

The pillar delivery apparatus (8) according to the fifth implementation allows the plurality of pillars (3) to be held with good stability by the holder (1) by sucking the air up through the air sucking path (13).

A sixth implementation of the pillar delivery apparatus (8), which may be adopted in combination with any one of the first to fifth implementations, has the following additional features. In the pillar delivery apparatus (8) according to the sixth implementation, the holder (1) includes a plurality of grooves (105) to hold the plurality of pillars (3).

The pillar delivery apparatus (8) according to the sixth implementation allows a plurality of pillars (3), punched out of the sheet (2) by laser cutting, to be held with good stability by the holder (1).

REFERENCE SIGNS LIST

1 Holder
10 Body
105 Groove
11 Suctioning Mechanism
112 Sucking Device
13 Air Sucking Path
2 Sheet
3 Pillar
4 Laser Cutter
5 Mounter
8 Pillar Delivery Apparatus
91 Substrate
910 Glass Panel
92 Substrate
920 Glass Panel
S1 Internal Space

The invention claimed is:

1. A method for delivering a plurality of pillars onto a substrate, including a glass panel, to manufacture a glass panel unit, the method comprising:
    an irradiation step including setting, over a holder, a sheet for use to form pillars and irradiating the sheet with a laser beam to remove the plurality of pillars from the sheet;
    a holding step including having the plurality of pillars, which have been removed from the sheet, held by the holder; and
    a mounting step including picking up some or all of the plurality of pillars from the holder and mounting the pillars onto the substrate;
    the holding step includes having the plurality of pillars, which have been removed from the sheet, suctioned onto the holder by sucking up the air through the holder.

2. The method of claim 1, further comprising a transporting step including transporting the holder in its entirety with all of the plurality of pillars still held by the holder, wherein
    the mounting step includes picking up some or all of the plurality of pillars from the holder transported and mounting the pillars onto the substrate.

3. The method of claim 1, wherein the holder includes a body with porosity.

4. The method of claim 1, wherein the holder includes a body with an air sucking path.

5. The method of claim 1, wherein the holding step includes having the plurality of pillars, which have been removed from the sheet, received in a plurality of grooves provided on the holder, and thereby held by the holder.

6. The method of claim 1, wherein the holding step includes having the plurality of pillars, which have been removed from the sheet, received in a plurality of grooves provided on the holder, suctioned onto an inner surface of the plurality of grooves, and thereby held by the holder.

7. A method for manufacturing a glass panel unit, the method comprising:
    a pillar delivery step including delivering the plurality of pillars onto the substrate by the method of claim 1;
    an arrangement step including laying a counter substrate, including a glass panel, over the substrate;
    a bonding step including bonding respective peripheral edges of the substrate and the counter substrate together to form an internal space where the plurality of pillars are located;
    an evacuation step including evacuating the internal space, and
    a sealing step including sealing the internal space while keeping the internal space evacuated.

8. An apparatus for delivering a plurality of pillars onto a substrate, including a glass panel, to manufacture a glass panel unit, the apparatus comprising:

a holder;

a sheet for use to form pillars, the sheet being configured to be set over the holder;

a laser cutter configured to remove the plurality of pillars from the sheet by irradiating the sheet with a laser beam;

a mounter configured to pick up some or all of the plurality of pillars held by the holder and mount the pillars onto the substrate, and a suctioning mechanism configured to have the plurality of pillars suctioned onto the holder.

9. The apparatus of claim 8, wherein the suctioning mechanism includes a sucking device configured to suck the air up through the holder.

10. The apparatus of claim 9, wherein the holder includes a body with porosity.

11. The apparatus of claim 9, wherein the holder includes a body with an air sucking path.

12. The apparatus of claim 8, wherein the holder includes a plurality of grooves configured to hold the plurality of pillars.

\* \* \* \* \*